United States Patent [19]
Poscich et al.

[11] Patent Number: 5,415,492
[45] Date of Patent: May 16, 1995

[54] COUPLING MECHANISM FOR QUICKLY AXIALLY ALIGNING ROTOR TO JOURNALS

[75] Inventors: Douglas V. Poscich, Glastonbury; Douglas E. Mosher, Oxford, both of Conn.

[73] Assignee: Farrel Corporation, Ansonia, Conn.

[21] Appl. No.: 86,714

[22] Filed: Jul. 2, 1993

[51] Int. Cl.⁶ .......................... F16B 1/00; F16C 3/00; B01F 7/00
[52] U.S. Cl. ..................... 403/371; 403/368; 403/374; 403/354; 74/595; 74/597
[58] Field of Search ............ 366/79, 88, 89, 90; 403/354, 338, 371, 370, 369, 368, 367, 365, 374, 358; 74/595, 596, 597; 285/141, 411, 412, 410, 415, 414, 413

[56] References Cited
U.S. PATENT DOCUMENTS

| 687,864 | 12/1901 | Smyth | 403/371 |
|---|---|---|---|
| 1,116,845 | 11/1914 | Rogers | 403/371 |
| 1,244,577 | 10/1917 | Bennett | 285/412 |
| 3,627,339 | 12/1971 | Burweger | 403/370 |
| 3,847,493 | 11/1974 | Peter et al. | 403/371 |
| 4,168,636 | 9/1979 | Kocher | 403/368 |
| 4,235,573 | 11/1980 | Peter et al. | 403/370 |
| 4,781,486 | 11/1988 | Mochizuki | 403/371 |
| 5,180,225 | 1/1993 | Piccolo et al. | |

OTHER PUBLICATIONS

R. M. Phelan, Fundamentals of Mechanical Design, pp. 207, 208; McGraw-Hill Book Company, Inc. (1962).
Ringfeder® Shaft-Hub Locking Devices Brochure W-200, pp. 2-4; Ringfeder Corp. (Feb. 1988).
Clamp-Tite® Makes Set Collars Obsolete brochure, 2 pages; Holo-Krome Company (1980).

*Primary Examiner*—Randolph A. Reese
*Assistant Examiner*—Anthony Knight
*Attorney, Agent, or Firm*—Parmelee, Bollinger & Bramblett

[57] ABSTRACT

A coupling mechanism for quickly coupling a rotor body to its drive and driven journals and thereby obtaining radial and axial alignment thereof in a closely confined space is provided. The coupling mechanism includes a split ring collar and a clamping ring securely holding in appropriate placement a chamfered split ring for radially and axially aligning the rotor and the journals, hereinafter referred to as co-axial alignment.

14 Claims, 3 Drawing Sheets

COUPLING MECHANISM FOR QUICKLY AXIALLY ALIGNING ROTOR TO JOURNALS

FIELD OF THE INVENTION

This invention relates to convenient means for coupling journals to a rotor body, particularly in a mixer. More particularly, this invention relates to a quick and convenient means for coupling journals to bring the axis of rotation of the rotor body and its journals into axial alignment and to do so within a limited space.

BACKGROUND OF THE INVENTION

Whereas rotors for continuous mixers were previously employed as one piece with their drive and driven journals, recently three-piece rotor construction has been developed for such mixers. Such three-piece rotor construction is disclosed for example in U.S. Pat. No. 5,180,225, issued Jan. 19, 1993 to J. R. Piccolo et al. The apparatus disclosed in said patent comprises a rotor body connected to discrete drive and driven journals. The many advantages of such three-piece rotor construction are evident, particularly that concerning the ease of detaching and removing the rotor bodies from the mixing chamber in which they are housed without necessity for removing the journals from the journal housings or otherwise disturbing journal bearings. This advantage significantly reduces the maintenance and downtime of mixers for cleaning rotors and mixing chambers or for changing rotor types or worn out rotors or replacing oil or polymer seals. In the aforesaid U.S. Pat. No. 5,180,225, quick coupling/disconnect means is disclosed for achieving coupling of the rotor body with the journals in proper co-axial alignment. The coupling/disconnect means in said patent employs concentricity and piloting means along with threaded collar retainers. One drawback of such coupling means resides in the fact that significant spacing between the rotor and journal housing is required to permit assembly and coupling of said coupling elements. Therefore, the quick connect/disconnect coupling elements of said patent cannot be employed in situations where the spacing between the rotor and journal housing are very limited.

Thus, it is highly desirable that a three-piece rotor construction be available wherein the coupling means employed does not require any significant spacing between the rotor body and the journal bodies in order to situate and connect the coupling means while still being able to attain the desired common axial alignment of the axis of rotation of the rotor and the journals. In addition, it would be most desirable to provide a quick connect/disconnect coupling means providing the aforesaid axial alignment whereby a one piece rotor may be easily and conveniently converted to three-piece rotor construction.

BRIEF SUMMARY OF THE INVENTION

This invention provides coupling means for bridging between an end portion of a journal and a nearly end portion of a rotor body for simultaneously applying radially-inwardly-directed force to said end portions for providing and retaining co-axial alignment of said end portions, with said radially-inwardly-directed force being substantially uniformly distributed around the axis of said end portion of both the journal and rotor body.

The bridging means, in a preferred embodiment, comprises a split ring assembly having an outer circumferential surface comprising two radially-inwardly chamfered surfaces diverging from each other in the axial direction with said split ring assembly being compressed radially-inwardly by a clamping ring axially secured to a split ring collar and wherein the clamping ring and split ring collars have chamfered inner surfaces mating with the chamfered outer surfaces of the split ring assembly whereby axially securing of the clamping ring to the split ring collar produces radially-inwardly-directed compressive force to the end portions of the rotor and journal for providing and maintaining the desired co-axial alignment.

End portions of the rotor and journal have groove and shelf sections to receive and retain the split ring assembly and additionally have mating key and keyway elements disposed on their axial faces for transmission of torque.

BRIEF DESCRIPTION OF THE DRAWINGS

The invention, together with further objects, features, advantages and aspects thereof will be more clearly understood from the following description considered in conjunction with the accompanying drawings, which are not necessarily drawn to scale, with the emphasis instead being placed upon clearly illustrating the principles of the invention. Like reference numerals indicate like parts throughout the different views.

Figure 1:
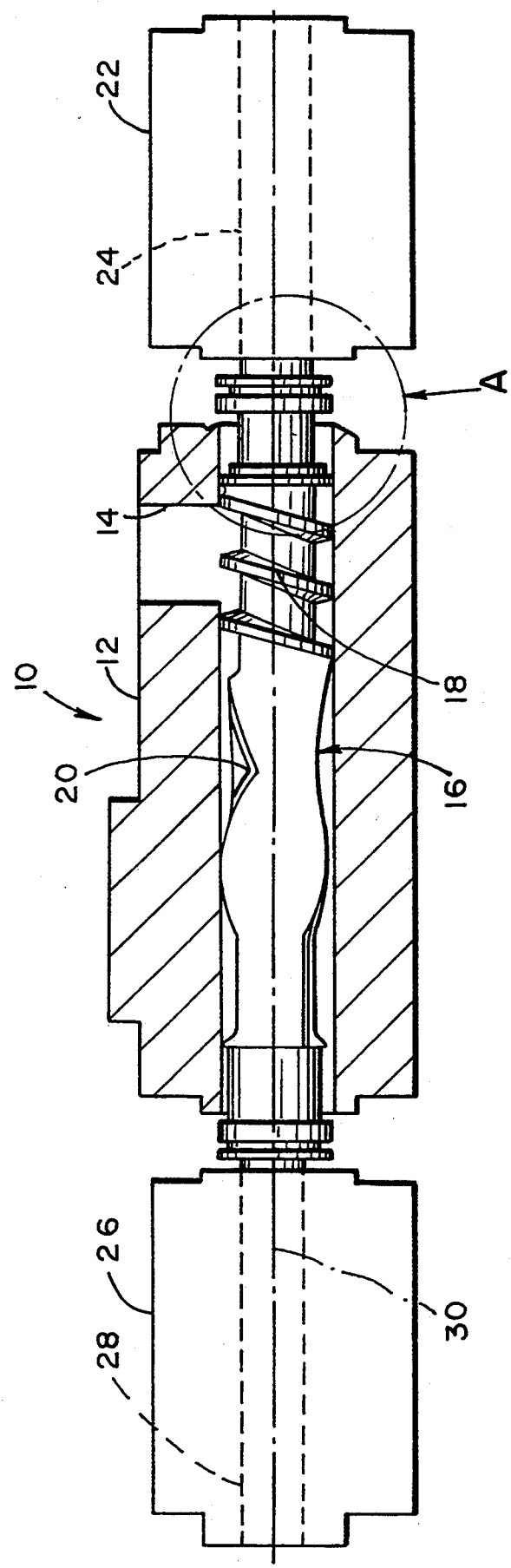
FIG. 1 is a longitudinal view, shown partially in section, taken along the axis of the rotor body and journals of a continuous mixer.

An environment for use of the invention is illustrated in FIG. 1. A mixing apparatus designated generally by reference numeral 10 comprises a mixer housing 12, a drive journal housing 22 and a driven (or water end) journal housing 26. Mixer housing 12 has a throat opening 14 for introduction of material to be mixed. The mixer housing 12 houses one or more main rotor bodies 16 which may comprise, in the main rotor body portion, a screw section 18, for conveying material from the throat, and a rotor wing section 20 for mixing and working of the material. Main rotor body 16 is connected at one end thereof to a drive journal 24 located in drive journal housing 22 and at its other end to a driven journal 28 in driven journal housing 26 such that the rotor body and journals have a common axis of rotation 30.

Figure 2:
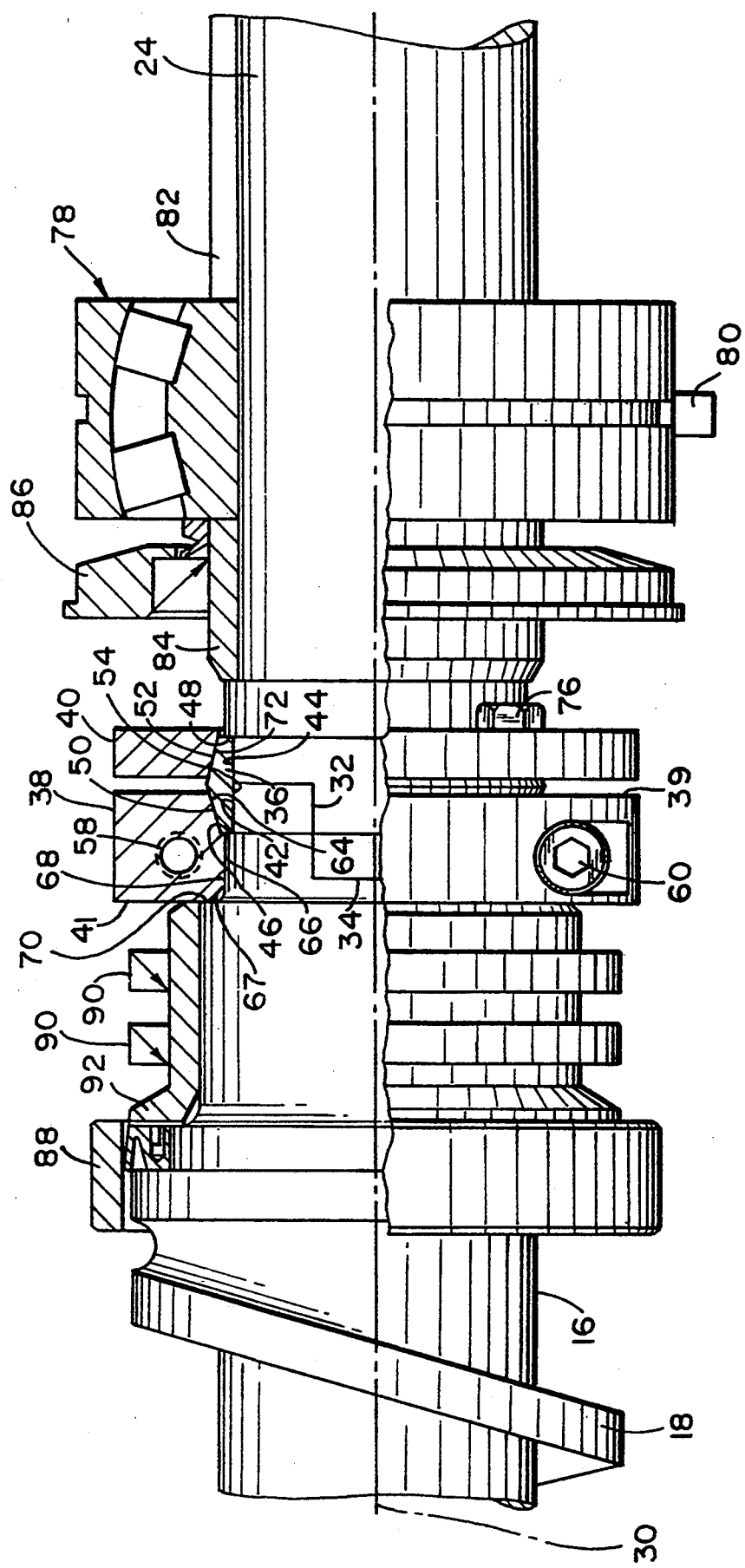
FIG. 2 is a longitudinal, enlarged, partial sectioned detail view of the region near and within circle "A" in FIG. 1.
Figure 3:
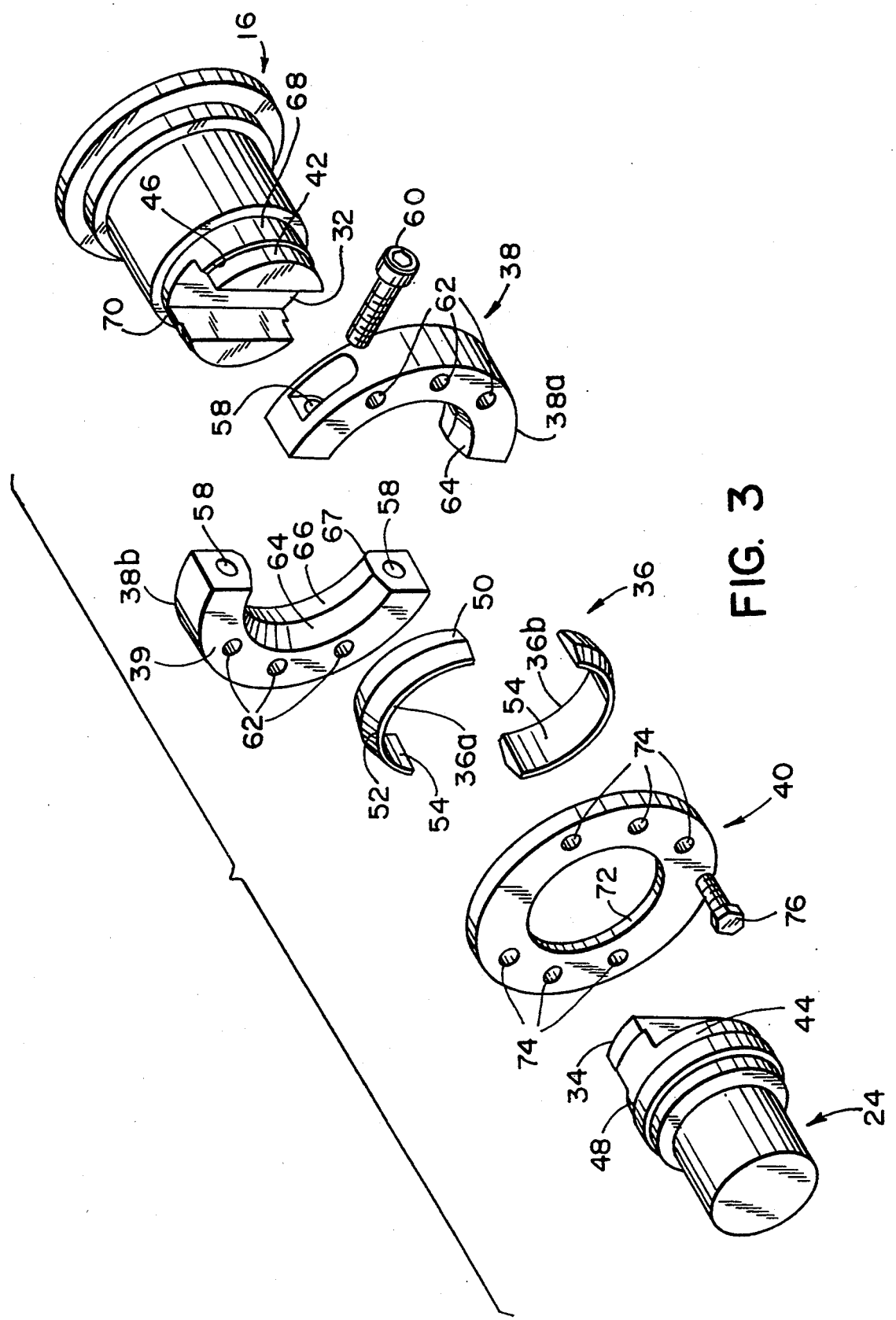
FIG. 3 is an exploded diagrammatic perspective view illustrating the various components of the novel quick coupling-aligning means of this invention.

Connection of the rotor body to a journal is illustrated in FIG. 2, which details the area generally within the area of circle A in FIG. 1, and FIG. 3 which shows the elements of the bridging means employed in the preferred embodiment of the invention. The axial face of end portion of rotor body 16 is provided with a diametrical slot or keyway 32 for receiving a mating complementary, diametrical protruding key portion 34 on the axial face of end portion of journal 24. For purposes of simplicity in illustrating the invention, reference is being made to drive journal 24, however, it is recognized that the reference is similarly applicable to a driven journal 28. Also for purposes of illustration, keyway 32 is being shown on the rotor body and key portion 34 on the journal, however, it will be appreciated that the keyway could be on the journal and mating key portion on the rotor body.

The bridging means for providing and retaining axial alignment of the rotor body 16 with either its drive 24 or driven 28 journals comprises, as a preferred embodiment, a split ring assembly 36, a split ring collar 38 and a clamping ring 40, as described hereinafter.

End portions of the rotor 16 and journal 24 are provided with circumferential groove portions 42 and 44, respectively, for seating of split ring assembly 36. When the key 32 is inserted and seated into keyway 34, the combined axial width of grooves 42 and 44 is approximately equal to the axial width of split ring assembly 36. Groove walls 46 and 48, respectively, of grooves 42 and 44 provide retaining means for seating and retention of split ring assembly 36 when installed as described hereinafter.

Split ring assembly 36 comprises an axially split ring having an outer circumferential surface comprising two chamfered faces 50 and 52. Chamfered face surfaces 50 and 52 are chamfered or beveled radially-inwardly at an angle of generally from about 10 10° to about 20° to the axis of rotation 30, preferably about 15°, with the two chamfered face surfaces 50 and 52 diverging inwardly from each other in the axial direction. The inner circumferential surface 54 of the split ring assembly 36 is essentially flat in the axial direction. The inner diameter of split ring 36 is generally equal to the outer diameter of grooves 42 and 44, for example 2.250 inches.

Split ring assembly 36 comprises two semi-circular ring halves 36a and 36b formed by sawing a machined ring in half by means of essentially diametrical opposite saw cuts. The widths of the saw cut are very small, generally about 2% or less of the inner circumference of the split ring. For example, for a split ring assembly with an inner diameter of 2.25 inches cuts of about 0.06 inches are employed. As a result, the split ring assembly 36 essentially completely surrounds the rotor 16 and journal 24 during coupling thereby providing effective co-axial alignment and coupling of the rotor and journal.

Split ring collar 38 is essentially a specially shaped and sized flange which comprises two semi circular ring or flange halves 38a and 38b sized and adapted to be joined together in a manner whereby said split ring collar halves, when joined, as described hereinafter, become an essentially integral ring circumferentially surrounding and exerting radially-inwardly compressive force on an outer face surface of the split ring assembly 36.

Split ring collar 38 is provided with threaded sockets 58 on its outer circumferential surface for suitably joining and maintaining the two split collar portions in engaged relationship by suitable attachment means, such as hex head screws 60. On one axial face 39 of the split ring collar are a plurality of spaced threaded sockets 62 for engagement and locking of clamping ring 40 thereto as discussed hereinafter. At least a portion of the inner circumferential surface of split ring collar 38 is provided as chamfered inner surface 64, chamfered radially outwardly and being complementary to one of the chamfered outer face surfaces 50 of split ring assembly 36 for mating therewith. A further portion 66 of the inner circumference surface of the split ring collar is axially flat for resting on a flat shelf portion 68 of the end portion of the rotor body 16. Shelf portion 68 terminates in a wall 70 for restraining any further movement of split ring collar 38 axially toward the main rotor body 16 in order to produce the desired radially-inwardly-directed force upon the split ring assembly 36. If desired, the further portion 66 may terminate in a beveled surface 67 to facilitate positioning the other axial face 41 of the split ring collar 38 against shelf wall 70.

Clamping collar 40 is essentially a flange provided with a chamfered inner circumferential surface 72 chamfered complementary to the other chamfered outer face surface 52 of split ring assembly 36 for mating therewith. A plurality of axially oriented, suitably spaced sockets 74 are provided through clamping ring 40 to receive attachment means 76, preferably suitable hex headed screws, to be threaded into threaded sockets 62 on the axial face 39 of the split ring collar 38 for connecting the clamping ring 40 to split ring collar 38 thereby engaging chamfered surfaces 64 and 72 of the split ring collar 38 and clamping ring 40, respectively, in mating contact with chamfered surfaces 50 and 52 of split ring assembly 36. As clamping ring 40 and split collar 38 are drawn into tightened engagement with each other by the tightening of screws 76 into threaded sockets 62 radially-inwardly-directed force is exerted upon split ring assembly 36 to draw and retain the end portions of rotor 16 and journal 24 into co-axial alignment.

The angle of the chamfer of surfaces 64 and 72 is complementary to the angle of the chamfer of face surfaces 50 and 52 and this will generally be from about 10° to about 20° to the axis of rotation 30, preferably about 15°. The inner diameter of split ring collar 38, i.e. of flat surface 66, and clamping collar 40, i.e. radially innermost portion of beveled surface are sized to be less than the smallest diameter of face surfaces 50 and 52 of the split ring assembly 36 so that as clamping collar 40 and split ring collar 38 are brought into tightening engagement with each other, as hereinbefore described, chamfered surfaces 64 and 72 mate with faces surfaces 50 and 52 and produce radially-inwardly compressive force thereon coupling rotor end 16 and journal end 24 into co-axially aligned arrangement by means of split ring assembly halves 36a and 36b being brought together around the end portion and being situated and retained in grooves 42 and 44.

Installation and coupling of rotor bodies to journals with the coupling means of this invention is readily and quite simply accomplished and can be done where there is almost no clearance between the end portions of the journal and rotor body, as will be understood from the installation description hereinafter.

It will be appreciated that the end portions of rotor body 16 and journal 24 as described hereinbefore can be an integral part of a new rotor and journals or if modifying and replacing old rotor—journal arrangement the end portions thereof may be machined to have the keyway 32, key 34, grooves 42 and 44, groove end walls 46 and 48, shelf 68 and shelf wall 70 or end portions having such features may be produced and then suitably attached to the end of existing main rotor bodies or journals.

Referring again to FIG. 2, the method by which a rotor body 16 is joined and quickly coupled to a journal 24 having the aforementioned features on the end portion thereof will be illustrated. Journal 24 is first installed or is already existing in a suitable journal housing and is enclosed in bearing assembly 78, having bearing pin 80, and spacers 82 and 84. A suitable face seal assembly 86 is also provided on the journal 24. To begin installation of the coupling method, clamping ring 40 is slipped loosely onto the journal 24. Then, a main rotor body 16 is lined up so that keyway 32 of rotor body 16 slips snugly around the key 34 on journal 24. Split ring assembly 36 is then placed in adjoining grooves 42 and 44 bridging the rotor body 16 and the journal 24. Split ring collar 36 is then positioned around the rotor end portion with axial face 39 thereof facing clamping collar 40. When screws 60 are tightened into threaded sockets 58 chamfered surface 64 is forced into engagement with chamfered face surface 50 of the split ring assembly 36. Thereafter, clamping collar 40 is slid axially toward the split ring collar 38 and screws 76 are inserted through sockets 74 and tightened into threaded sockets 62 on the axial face 39 of the split ring collar 38 thereby drawing chamfered surface 72 into mating engagement with chamfered face surface 52 of split ring assembly 36. Thereafter, screws 76 are further threaded into sockets 62 in a manner to maintain an essentially uniform gap between clamping ring 40 and split ring collar 38. Tightening of screws 76 into sockets 62 produces radially-inwardly-directed force upon split ring assembly 36 drawing and retaining the end portions of the main rotor body 16 and the journal 24 into co-axial alignment. The rotor body may be installed in the mixing chamber as shown in FIGS. 1 and 2 with suitable primary solid seal member 88, solid clipper seals 90 and a primary sealing ring 90, which in and of themselves form no part of the present invention.

Reversing the aforedescribed procedure enables a user to easily and quickly disconnect a main rotor body from a journal without the necessity of disturbing the journal installation and requiring essentially no clearance between the axial faces of the end portions of the main rotor body and the journal. Thus, the user is able to easily remove rotor bodies from mixing chambers for cleaning the rotor or mixing chamber or for repair of worn or damaged rotor bodies or journals or for change or replacement of rotor bodies types.

It will be appreciated that a plane drawn through the splits in split ring assembly 36 and a plane drawn through the splits in split collar 38 are preferably located at radial angles about 90° apart, i.e. the planes are generally perpendicular to each other. Also, a plane drawn through the splits of split ring assembly 36 is generally oriented to be at a radial angle of about at 90° relative to the diametric direction of keyway Such an orientation is desirable to ensure maximum strength and stability of the coupling means and to most effectively obtain and retain co-axial alignment of rotor and journals.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. Coupling assembly for coupling a rotor body to a journal to provide a common axis of rotation for said rotor body and journal, said coupling assembly comprising:

bridge means bridging between an end portion of the journal and a nearby end portion of the rotor body for simultaneously applying radially-inwardly-directed force to said end portions for providing and retaining co-axial alignment of said end portions, said radially-inwardly-directed force being substantially uniformly circumferentially distributed around the axis of said end portions of both the journal and the rotor body;

wherein said means bridging between end portions of the journal and rotor body comprises:

a split ring assembly essentially completely surrounding the end portions of the journal and rotor body and comprising two semi-circular ring halves, each half having an outer circumferential chamfered surface comprising two faces, said chamfered faces being chamfered radially inwardly and diverging inwardly from each other in the axial direction, and having an inner circumferential surface being essentially flat in the axial direction;

a split ring collar comprising two semi-circular ring halves and having an inner circumferential surface, a first portion of said inner circumferentail surface being chamfered complementary to and mating with one of the chamfered outer faces of said split ring assembly and a second portion of said inner circumferential surface substantially axially flat;

a clamping ring having a chamfered inner surface, said chamfered inner surface chamfered complementary to and mating with the other chamfered outer face of said split ring assembly;

the two semi-circular ring halves of said split ring collar being secured together and said clamping ring being secured to the split ring collar in a manner whereby the mating of the chamfered inner surface of the split ring collar with one of the chamfered outer faces of the split ring assembly and the mating of the chamfered inner surface of the clamping ring with the other chamfered outer face of the split ring assembly produces said radially-inwardly-directed substantially uniformly circumferential distributed force from said split ring assembly to said end portions of the rotor and journal for providing and retaining co-axial alignment of said end portions.

2. A coupling assembly of claim 1 additionally comprising mating key and keyway elements disposed on axial faces of the end portions of the rotor and journal for transmission of torque.

3. A coupling assembly as claimed in claim 2 wherein the angle of chamfer of the chamfered surfaces is about 15° relative to the axis of rotation.

4. A coupling assembly as claimed in claim 2 wherein the end portions of the journal and the rotor body are each provided with a groove for seating of the split ring assembly on said ends of the journal and rotor body, said grooves having a combined axial width approximately equal to a width of the essentially flat inner circumferential surface of the split ring assembly.

5. A coupling assembly as claimed in claim 4 wherein the two semi-circular ring halves of the split ring collar are secured together by threaded screws.

6. A coupling assembly as claimed in claim 4 wherein the substantially axially flat portion of the inner circumferential surface of the split ring collar rests on a substantially axially flat shelf portion on the rotor body.

7. A coupling assembly as claimed in claim 6 wherein the shelf portion on the rotor body terminates in a radially transverse wall for restraining axial movement of the split ring collar along the rotor body.

8. A coupling assembly as claimed in claim 1 wherein the angle of chamfer of the chamfered surfaces is about 15° relative to the axis of rotation.

9. A coupling assembly as claimed in claim 1 wherein the end portions of the journal and the rotor body are each provided with a groove for seating of the split ring assembly on said ends of the journal and rotor body, said grooves having a combined axial width approximately equal to a width of the essentially flat inner circumferential surface of the split ring assembly.

10. A coupling assembly as claimed in claim 9 wherein the substantially axially flat portion of the inner circumferential surface of the split ring collar rests on a substantially axially flat shelf portion on the rotor body.

11. A coupling assembly as claimed in claim 10 wherein the shelf portion on the rotor body terminates in a radially transverse wall for restraining axial movement of the split ring collar along the rotor body.

12. A coupling assembly as claimed in claim 1 wherein the two semi-circular ring halves of the split ring collar are secured together by threaded screws.

13. A coupling assembly as claimed in claim 1 wherein the substantially axially flat portion of the inner circumferential surface of the split ring collar rests on a substantially axially flat shelf portion on the rotor body.

14. A coupling assembly as claimed in claim 13 wherein the shelf portion on the rotor body terminates in a radially transverse wall for restraining axial movement of the split ring collar along the rotor body.

* * * * *